US 7,403,483 B2

(12) United States Patent
Umezawa (10) Patent No.: US 7,403,483 B2
(45) Date of Patent: Jul. 22, 2008

(54) OPTIMUM ROUTE CALCULATION METHOD AND STORAGE MEDIUM WHICH STORES OPTIMUM ROUTE CALCULATION PROGRAM

(75) Inventor: Yohei Umezawa, Tokyo (JP)

(73) Assignee: NEC Corporation, Tokyo (JP)

( * ) Notice: Subject to any disclaimer, the term of this patent is extended or adjusted under 35 U.S.C. 154(b) by 929 days.

(21) Appl. No.: 10/459,599

(22) Filed: Jun. 12, 2003

(65) Prior Publication Data

US 2003/0231599 A1 Dec. 18, 2003

(30) Foreign Application Priority Data

Jun. 17, 2002 (JP) .................. 2002-176196

(51) Int. Cl.
H04J 1/16 (2006.01)
G01R 31/08 (2006.01)
G06F 11/00 (2006.01)
H04L 1/00 (2006.01)
H04L 12/26 (2006.01)
H04Q 11/00 (2006.01)

(52) U.S. Cl. .................. 370/238; 370/252; 370/258; 370/386; 370/392; 370/401

(58) Field of Classification Search .................. 370/255, 370/238, 252
See application file for complete search history.

(56) References Cited

U.S. PATENT DOCUMENTS

| | | | | |
|---|---|---|---|---|
| 5,274,643 A | * | 12/1993 | Fisk | 370/238 |
| 5,841,758 A | * | 11/1998 | Chen et al. | 370/238 |
| 6,490,244 B1 | * | 12/2002 | Pegrum et al. | 370/216 |
| 6,577,601 B1 | * | 6/2003 | Wolpert | 370/238 |
| 6,628,618 B1 | * | 9/2003 | Cinkler | 370/238 |
| 6,744,769 B1 | * | 6/2004 | Siu et al. | 370/395.32 |
| 6,819,654 B2 | * | 11/2004 | Soloway et al. | 370/238 |

(Continued)

FOREIGN PATENT DOCUMENTS

JP 9-83546 3/1997

(Continued)

OTHER PUBLICATIONS

A dynamic self-healing routing strategy for ATM networks; Bolla, R.; Dalal'ah, A.; Davoli, F.; Marchese, M.; Obaidat, M.S.; Performance, Computing, and Communications Conference, 1997. IPCCC 1997., IEEE International; Feb. 5-7, 1997, pp. 215-220.*

(Continued)

Primary Examiner—Seema S. Rao
Assistant Examiner—Xavier Szewai Wong
(74) Attorney, Agent, or Firm—McGinn IP Law Group, PLLC (57) ABSTRACT

In an optimum route calculation method of calculating an optimum route in a network which has a plurality of nodes and a plurality of transmission paths, and in which a cost is defined for each transmission path, an evaluation value is obtained on the basis of the maximum cost of each transmission path included in a determined route and a route to be evaluated and the number of hops from the determined route to the route to be evaluated. A route is determined on the basis of the evaluation value. A storage medium which stores the optimum route calculation program is also disclosed.

9 Claims, 8 Drawing Sheets

U.S. PATENT DOCUMENTS

| | | | |
|---|---|---|---|
| 6,925,061 B2 * | 8/2005 | Lee et al. | 370/238 |
| 6,977,931 B1 * | 12/2005 | Hadziomerovic | 370/392 |
| 7,042,846 B2 * | 5/2006 | Bauer | 370/238 |
| 7,242,669 B2 * | 7/2007 | Bundy et al. | 370/252 |
| 2002/0150039 A1 * | 10/2002 | Valdevit | 370/216 |
| 2002/0181403 A1 * | 12/2002 | Shiraki et al. | 370/238 |
| 2002/0186665 A1 * | 12/2002 | Chaffee et al. | 370/255 |
| 2002/0191545 A1 * | 12/2002 | Pieda et al. | 370/238 |

FOREIGN PATENT DOCUMENTS

| | | |
|---|---|---|
| JP | 2001-244974 | 9/2001 |
| JP | 2002-141949 | 5/2002 |
| JP | 2004-511957 | 4/2004 |

OTHER PUBLICATIONS

Japanese Office Action dated Jan. 9, 2007, with partial English translation.

* cited by examiner

OPTIMUM ROUTE CALCULATION METHOD AND STORAGE MEDIUM WHICH STORES OPTIMUM ROUTE CALCULATION PROGRAM

BACKGROUND OF THE INVENTION

The present invention relates to an optimum route calculation method and optimum route calculation program which derive, with a small calculation amount, a route that is reachable with a small number of hops while avoiding any bottleneck portions in a communication network.

A conventional typical route calculation algorithm is the Dijkstra's algorithm which calculates the total costs of links in routes as evaluation values and selects a route with the minimum total cost. The Dijkstra's algorithm is widely used as a calculation method with the shortest route calculation time.

However, the Dijkstra's algorithm may select a route passing through a link that can be a traffic bottleneck in the network and has an excessively high cost. This is because since the total cost value is used as the evaluation value for routing, even the excessively high link cost may be canceled by synthesis.

An example of a system to solve this problem is disclosed in a route calculation method of Japanese patent Laid-Open No. 2001-244974. This prior art is a connectionless communication network constituted by terminal apparatuses, repeaters, and a plurality of links that connect the apparatuses. According to the characteristic feature of this connectionless communication network, when a routing parameter (cost) is assigned to each link, and a route from an arbitrary terminal apparatus to another arbitrary terminal apparatus in the communication network is to be calculated, one of the plurality of routes that connect the terminal apparatuses, whose minimum cost of each link included in the route is maximum, is calculated.

In the route calculation method disclosed in Japanese patent Laid-Open No. 2001-244974 described above, however, although a link that may be a bottleneck can be avoided, a route having an excessively large number of hops may be selected because the costs are not added. In a network, an increase in the number of hops may lead to an increase in transfer delay or the like.

SUMMARY OF THE INVENTION

It is an object of the present invention to provide an optimum route calculation method and a storage medium which stores an optimum route calculation program, which derive, with a small calculation amount, a route that is reachable with a small number of hops while avoiding any bottleneck portions in a communication network.

In order to achieve the above object, according to the present invention, there is provided an optimum route calculation method of calculating an optimum route in a network which has a plurality of nodes and a plurality of transmission paths that connect the nodes, and in which a cost is defined for each transmission path, comprising the steps of obtaining an evaluation value on the basis of a maximum value of the cost of each transmission path included in a determined route and a route to be evaluated and the number of hops from the determined route to the route to be evaluated, and determining a route on the basis of the evaluation value.

DESCRIPTION OF THE PREFERRED EMBODIMENTS

An embodiment of an optimum route calculation method and optimum route calculation program according to the present invention will be described next in detail with reference to the accompanying drawings.

An algorithm according to the embodiment of the present invention will be described below. With this algorithm, a route from an apparatus as a starting point in a network to another apparatus in the network is calculated.

At the start of calculation, parameters are initialized first. More specifically, A parameter that indicates an apparatus whose route from the starting point to itself is determined is "none".

A parameter that indicates an apparatus whose route from the starting point to itself is undetermined is "all apparatuses".

A parameter that indicates the evaluation value of the apparatus as the starting point is "0". Parameters that indicate the evaluation values of the remaining apparatuses are "∞".

The followings are included as the parameters.

A parameter that indicates an apparatus whose route from the starting point is determined (a parameter that indicates a set of apparatuses whose routes from the starting point to themselves are determined).

A parameter that indicates an apparatus whose route from the starting point is undetermined (a parameter that indicates a set of apparatuses whose routes from the starting point to themselves are undetermined).

A parameter that indicates a determined route (a parameter that indicates routes from the starting point to the apparatuses, which are determined as a result of calculation).

A parameter that indicates an evaluation value (this parameter is assigned to each apparatus and compared in selecting a route, and an apparatus having a small evaluation value is selected as the next route).

A loop process for route calculation is executed next. Every time the loop is executed, a route is obtained. Until the routes are calculated, the loop is repeated for all apparatuses. The contents of the loop process are as follows.

1. An apparatus v having the minimum evaluation value is selected from apparatuses whose routes are undetermined.

2. Routes from apparatuses with determined routes to the apparatus v are defined as determined routes.

3. The apparatus v is added to the apparatuses with determined routes.

4. An evaluation value C(u) is calculated for each neighboring apparatus u of the apparatus v, in the apparatuses whose routes are undetermined.

The evaluation value calculation procedures will be described below.

a: The value of the maximum cost in the links from the starting point to the apparatus v is compared with the cost of the link between the apparatus v and the apparatus u, and the larger value is defined as the maximum cost in the route from the starting point to the apparatus u.

b: The maximum cost obtained in a is multiplied by the value of the number of hops in the route from the starting point to the apparatus u to obtain the evaluation value of the apparatus u.

c: The evaluation value obtained in b is compared with the evaluation value of the same apparatus in the immediately preceding loop process. If the evaluation value obtained in b is smaller, this value is defined as the new evaluation value C(u) by updating it. If the evaluation value in the immediately preceding loop process is smaller, the evaluation value is not updated.

In b, when

Evaluation value C=(maximum value of costs of links included in route)×(number of hops in route)

is calculated, a route can be selected while suppressing both the maximum cost and the number of hops in the route.

The route calculation procedures in the network shown in FIG. 1 will be described next on the basis of the above algorithm. In the system shown in FIG. 1, reference symbols A and B denote terminal apparatuses. Reference numerals 101 to 108 denote repeaters that transfer packets. Links 201 to 214 that connect the apparatuses are indicated by straight lines.

Figure 1:
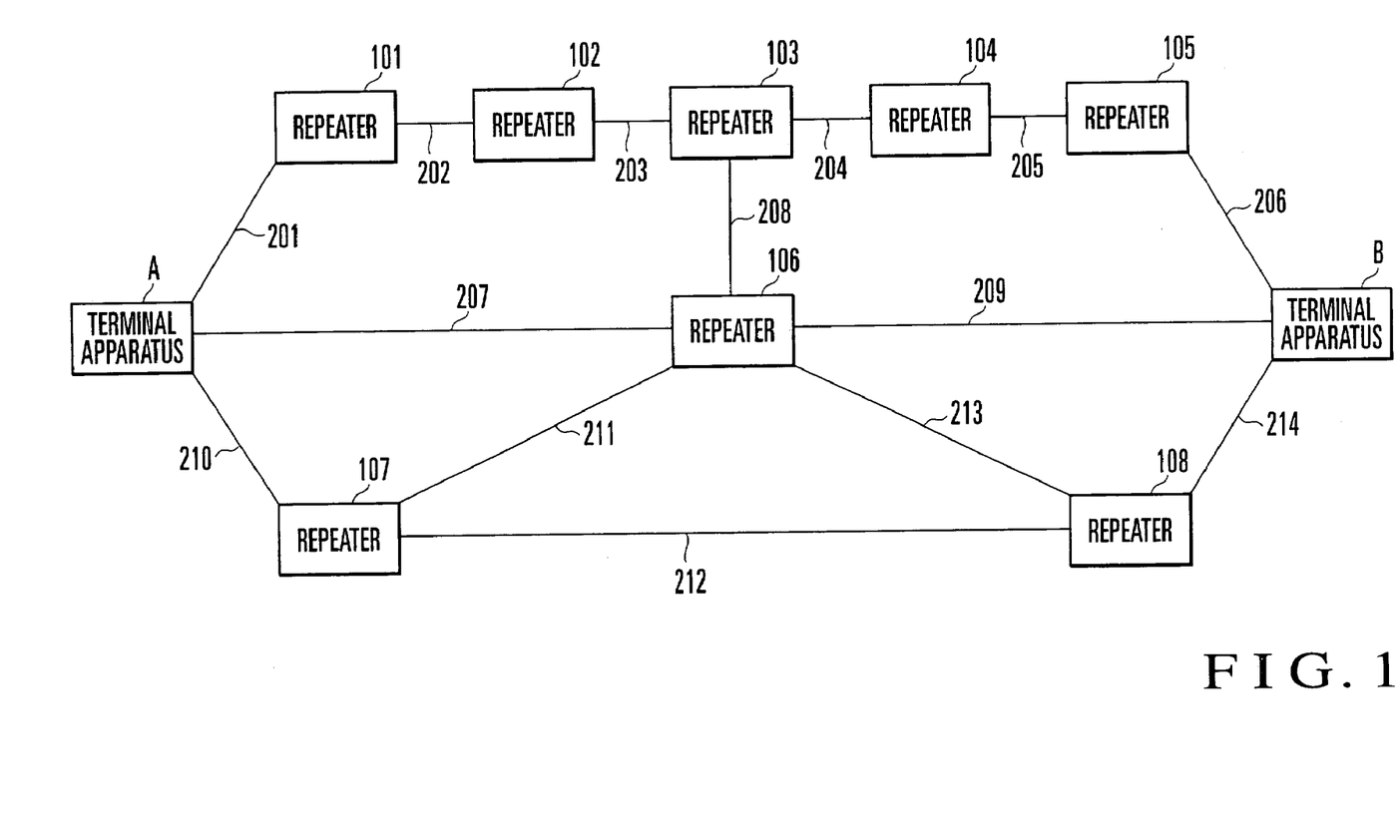
FIG. 1 is a view showing the system configuration of a communication network.

As shown in FIG. 1, the repeater 101 is connected to the terminal apparatus A through the node 201. The repeater 102 is connected to the repeater 101 through the node 202. The repeater 103 is connected to the repeater 102 through the node 203. The repeater 104 is connected to the repeater 103 through the node 204. The repeater 105 is connected to the repeater 104 through the node 205. The terminal apparatus B is connected to the repeater 105 by the node 206.

The repeater 106 is connected to the terminal apparatus A through the node 207. The terminal apparatus B is connected to the repeater 106 through the node 209.

The repeater 107 is connected to the terminal apparatus A through the node 210. The repeater 108 is connected to the repeater 107 through the node 212. The terminal apparatus B is connected to the repeater 108 through the node 214.

The repeater 106 is connected to the repeaters 103, 107, and 108 through the nodes 208, 211, and 213, respectively.

Packets sent from the terminal apparatuses A and B are sequentially transferred through the repeaters 101 to 108 and the links. Costs are set for the respective links. A route is calculated on the basis of the values. A link having an excessively high cost is regarded as a bottleneck in the communication network.

Table 1 shows the costs of the links in the network shown in FIG. 1.

TABLE 1

| Link | Cost |
| --- | --- |
| Apparatus A - apparatus 101 | 1 |
| Apparatus 101 - apparatus 102 | 2 |
| Apparatus 102 - apparatus 103 | 2 |
| Apparatus 103 - apparatus 104 | 2 |
| Apparatus 104 - apparatus 105 | 2 |
| Apparatus 105 - apparatus B | 1 |
| Apparatus A - apparatus 106 | 7 |
| Apparatus 106 - apparatus B | 1 |
| Apparatus A - apparatus 107 | 3 |
| Apparatus 107 - apparatus 108 | 3 |
| Apparatus 108 - apparatus B | 3 |
| Apparatus 103 - apparatus 106 | 3 |
| Apparatus 106 - apparatus 107 | 5 |
| Apparatus 106 - apparatus 108 | 2 |

As is apparent from Table 1, the link between the apparatus A and the apparatus 106 and the link between the apparatus 106 and the apparatus 107 have relatively large values. These links may be bottlenecks.

Figure 2:
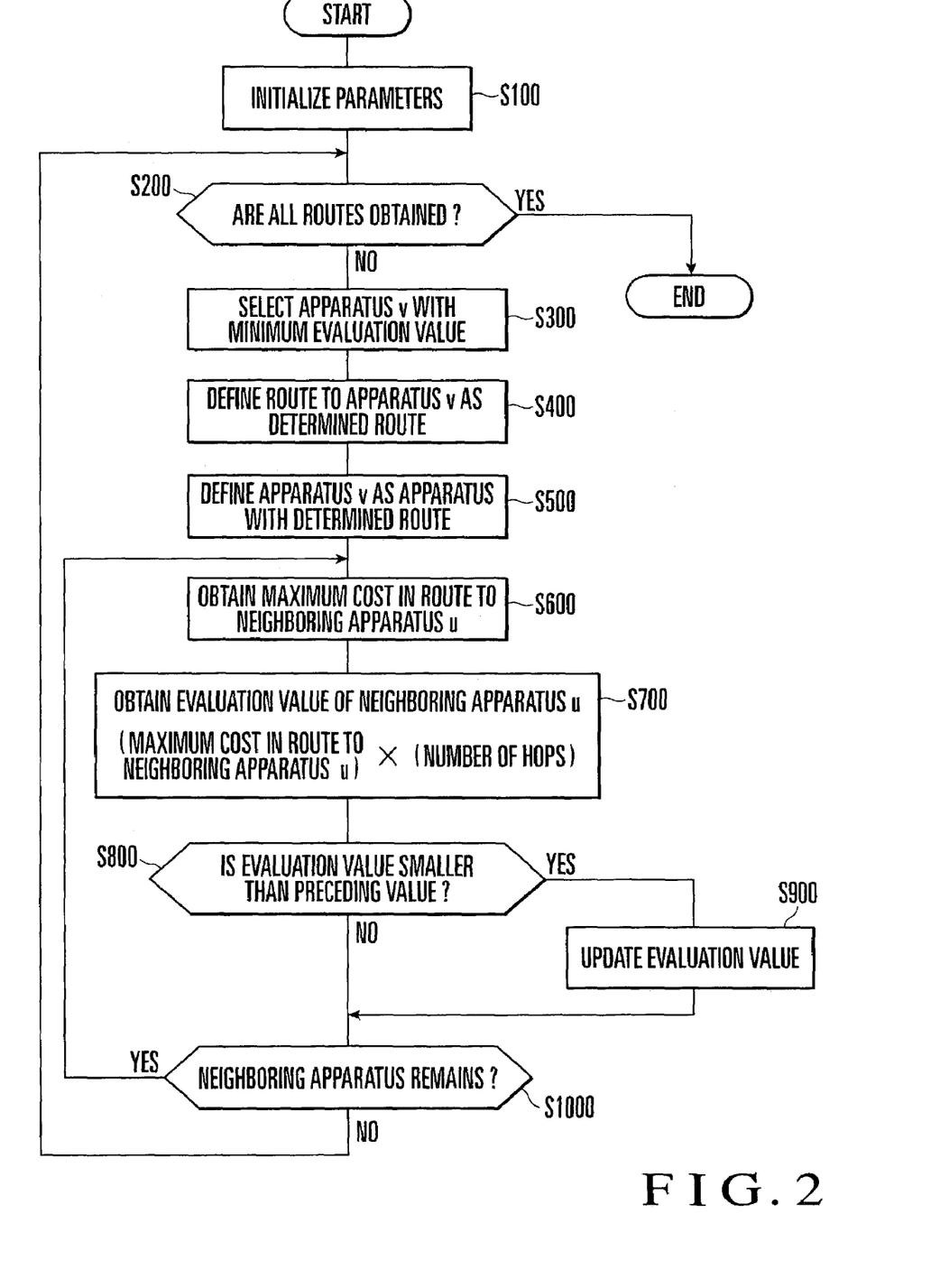
FIG. 2 is a flow chart showing a route calculation algorithm.

Procedures for executing route calculation from the terminal apparatus A as a starting point by applying the above algorithm to the network shown in FIG. 1 will be described below. At the start of calculation, the parameters are initialized to values shown in Table 2 (step S100).

TABLE 2

| Parameter | Value | |
| --- | --- | --- |
| Apparatuses for Which Routes from Starting Point are Determined | None | |
| Apparatuses for Which Routes from Starting Point are Undetermined | A, 101, 102, 103, 104, 105, 106, 107, 108, B | |
| Determined Routes | None | |
| Evaluation Values | $C(A) = 0$ | $C(105) = \infty$ |
| | $C(101) = \infty$ | $C(106) = \infty$ |
| | $C(102) = \infty$ | $C(107) = \infty$ |
| | $C(103) = \infty$ | $C(108) = \infty$ |
| | $C(104) = \infty$ | $C(B) = \infty$ |

More specifically,

Apparatuses whose routes are determined are "none".

Apparatuses whose routes are undetermined are all apparatuses A, 101, 102, 103, 104, 105, 106, 107, 108, and B.

An evaluation value C(A) of the apparatus A as the starting point of route calculation is initialized to 0. All evaluation values C(v) of the remaining apparatuses v are initialized to $\infty$.

The first loop process for route calculation is started. An apparatus having the minimum evaluation value is selected from the apparatus (i.e., all apparatuses) whose routes are undetermined (step S300). In this case, since the evaluation value of the apparatus A is 0 and minimum, the apparatus A is selected. Since no link for A→A is present, no determined route is present yet at this time. The apparatus A is defined as an apparatus with a determined route (step S500).

Next, the evaluation values C are obtained for the apparatuses (101, 106, and 107), which are neighboring apparatuses of the apparatus A, of the apparatuses (apparatuses except the apparatus A) whose routes are undetermined.

First, the evaluation value of the apparatus 101 is calculated. Of the links in the route to the apparatus A, the maximum cost is 0, and the cost of the link between the apparatus A and the apparatus 101 is 1. Hence, the maximum cost in the route from the apparatus A to the apparatus 101 is 1 (step S600). In this route, the number of hops from the apparatus A to the apparatus 101 is 1. The maximum cost is multiplied by the number of hops to obtain the evaluation value (=1) of the apparatus 101 (step S700). Since 1 is smaller than the current evaluation value=∞ in Table 2 (YES in step S800), this value is employed, and the evaluation value is updated to C{101←(A)}=1 (step S900). Note that {101←(A)} represents the evaluation value of the route from the apparatus A to the apparatus 101.

Next, the evaluation value of the apparatus 106 is calculated. Of the links in the route to the apparatus A, the maximum cost is 0, and the cost of the link between the apparatus A and the apparatus 106 is 7. Hence, the maximum cost in the route from the apparatus A to the apparatus 106 is 7 (step S600). In this route, the number of hops from the apparatus A to the apparatus 106 is 1. The maximum cost is multiplied by the number of hops to obtain the evaluation value (=7) of the apparatus 106 (step S700). Since 7 is smaller than the current evaluation value=∞ in Table 2 (YES in step S800), this value is employed, and the evaluation value is updated to C{106←(A)}=7 (step S900).

Furthermore, the evaluation value of the apparatus 107 is calculated. Of the links in the route to the apparatus A, the maximum cost is 0, and the cost of the link between the apparatus A and the apparatus 107 is 3. Hence, the maximum cost in the route from the apparatus A to the apparatus 107 is 3 (step S600). In this route, the number of hops from the apparatus A to the apparatus 107 is 1. The maximum cost is multiplied by the number of hops to obtain the evaluation value (=3) of the apparatus 107 (step S700). Since 3 is smaller than the current evaluation value=∞ in Table 2 (YES in step S800), this value is employed, and the evaluation value is updated to C{107←(A)}=3 (step S900). As a result, parameters and routes as shown in Table 3 are obtained.

TABLE 3

| Parameter | Value | |
|---|---|---|
| Apparatuses for Which Routes from Starting Point are Determined | A | |
| Apparatuses for Which Routes from Starting Point are Undetermined | 101, 102, 103, 104, 105, 106, 107, 108, B | |
| Determined Routes | None | |
| Evaluation Values | $C(A) = 0$ | $C(105) = \infty$ |
| | $C\{101 \leftarrow (A)\} = 1$ | $C\{106 \leftarrow (A)\} = 7$ |
| | $C(102) = \infty$ | $C\{107 \leftarrow (A)\} = 3$ |
| | $C(103) = \infty$ | $C(108) = \infty$ |
| | $C(104) = \infty$ | $C(B) = \infty$ |

The second loop process is executed. An apparatus having the minimum evaluation value is selected from the apparatus (i.e., apparatuses except the apparatus A) whose routes are undetermined. Since C(101)=1, the apparatus 101 is selected (step S300). The route A→101 is defined as a determined route (step S400). The apparatus 101 is defined as an apparatus with a determined route (step S500). The evaluation value C is calculated for the apparatus (only the apparatus 102 in this case), which is a neighboring apparatus of the apparatus 101, of the remaining apparatuses (apparatuses except the apparatuses A and 101).

Of the links in the route to the apparatus 101, the maximum cost is 1, and the cost of the link between the apparatus 101 and the apparatus 102 is 2. Hence, the maximum cost in the route from the apparatus A to the apparatus 102 is 2 (step S600). In this route, the number of hops from the apparatus A to the apparatus 102 is 2. The maximum cost is multiplied by the number of hops to obtain the evaluation value (=4) of the apparatus 102 (step S700). Since 4 is smaller than the current evaluation value=∞ in Table 3 (YES in step S800), this value is employed, and the evaluation value is updated to C{102←(101)}=4 (step S900). As a result, parameters and routes as shown in Table 4 are obtained.

TABLE 4

| Parameter | Value | |
|---|---|---|
| Apparatuses for Which Routes from Starting Point are Determined | A, 101 | |
| Apparatuses for Which Routes from Starting Point are Undetermined | 102, 103, 104, 105, 106, 107, 108, B | |
| Determined Routes | A → 101 | |
| Evaluation Values | $C(A) = 0$ | $C(105) = \infty$ |
| | $C\{101 \leftarrow (A)\} = 1$ | $C\{106 \leftarrow (A)\} = 7$ |
| | $C\{102 \leftarrow (101)\} = 4$ | $C\{107 \leftarrow (A)\} = 3$ |
| | $C(103) = \infty$ | $C(108) = \infty$ |
| | $C(104) = \infty$ | $C(B) = \infty$ |

Routes shown in Tables 5, 6, and 7 are obtained in accordance with the same procedures as described above.

TABLE 5

| Parameter | Value | |
|---|---|---|
| Apparatuses for Which Routes from Starting Point are Determined | A, 101, 107 | |
| Apparatuses for Which Routes from Starting Point are Undeteremined | 102, 103, 104, 105, 106, 108, B | |
| Determined Routes | A → 101 | |
| | A → 107 | |
| Evaluation Values | $C(A) = 0$ | $C(105) = \infty$ |
| | $C\{101 \leftarrow (A)\} = 1$ | $C\{106 \leftarrow (A)\} = 7$ |
| | $C\{102 \leftarrow (101)\} = 4$ | $C\{107 \leftarrow (A)\} = 3$ |
| | $C(103) = \infty$ | $C\{108 \leftarrow (107)\} = 6$ |
| | $C(104) = \infty$ | $C(B) = \infty$ |

TABLE 6

| Parameter | Value | |
|---|---|---|
| Apparatuses for Which Routes from Starting Point are Determined | A, 101, 102, 107 | |
| Apparatuses for Which Routes from Starting Point are Undetermined | 103, 104, 105, 106, 108, B | |
| Determined Routes | A → 101 → 102 | |
| | A → 107 | |
| Evaluation Values | $C(A) = 0$ | $C(105) = \infty$ |
| | $C\{101 \leftarrow (A)\} = 1$ | $C\{106 \leftarrow (A)\} = 7$ |
| | $C\{102 \leftarrow (101)\} = 4$ | $C\{107 \leftarrow (A)\} = 3$ |
| | $C\{103 \leftarrow (102)\} = 6$ | $C\{108 \leftarrow (107)\} = 6$ |
| | $C(104) = \infty$ | $C(B) = \infty$ |

TABLE 7

| Parameter | Value |
|---|---|
| Apparatuses for Which Routes from Starting Point are Determined | A, 101, 102, 103, 107 |

TABLE 7-continued

| Parameter | Value | |
|---|---|---|
| Apparatuses for Which Routes from Starting Point are Undetermined | 104, 105, 106, 108, B | |
| Determined Routes | A → 101 → 102 → 103<br>A → 107 | |
| Evaluation Values | C(A) = 0 | C(105) = ∞ |
| | C{101 ← (A)} = 1 | C{106 ← (A)} = 7 |
| | C{102 ← (101)} = 4 | C{107 ← (A)} = 3 |
| | C{103 ← (102)} = 6 | C{108 ← (107)} = 6 |
| | C{104 ← (103)} = 8 | C(B) = ∞ |

In the state shown in Table 7, the apparatuses 104, 105, 106, 108, and B remain as apparatuses whose routes are undetermined. Of these apparatuses, the apparatus 108 with the smallest evaluation value is selected. The route of the apparatus 107→apparatus 108 is defined as a determined route. The apparatus 108 is defined as an apparatus with a determined route. The evaluation values C are calculated for the apparatuses (apparatuses 106 and B), which are neighboring apparatuses of the apparatus 108, of the remaining apparatuses (apparatuses 104, 105, 106, and B).

The evaluation value of the apparatus 106 is calculated. Of the links in the route to the apparatus 108, the maximum cost is 3, and the cost of the link between the apparatus 108 and the apparatus 106 is 2. Hence, the maximum cost in the route from the apparatus A to the apparatus 106 is 3. In this route, the number of hops from the apparatus A to the apparatus 106 is 3. The maximum cost is multiplied by the number of hops to obtain the evaluation value (=9) of the apparatus 106. Since 9 is larger than the current evaluation value=7 in Table 7, this value is not employed, and the evaluation value remains C{106←(A)}=7.

The evaluation value of the apparatus B is calculated. Of the links in the route to the apparatus 108, the maximum cost is 3, and the cost of the link between the apparatus 108 and the apparatus B is 3. Hence, the maximum cost in the route from the apparatus A to the apparatus B is 3. In this route, the number of hops from the apparatus A to the apparatus B is 3. The maximum cost is multiplied by the number of hops to obtain the evaluation value (=9) of the apparatus B. Since 9 is smaller than the current evaluation value =∞ in Table 7, this value is employed, and the evaluation value is updated to C{B←(108)}=9. As a result, parameters and routes as shown in Table 8 are obtained. Note that {B←(108)} represents the evaluation value from the determined route from the apparatus 108 to the apparatus B.

TABLE 8

| Parameter | Value | |
|---|---|---|
| Apparatuses for Which Routes from Starting Point are Determined | A, 101, 102, 103, 107, 108 | |
| Apparatuses for Which Routes from Starting Point are Undetermined | 104, 105, 106, B | |
| Determined Routes | A → 101 → 102 → 103<br>A → 107 → 108 | |
| Evaluation Values | C(A) = 0 | C(105) = ∞ |
| | C{101 ← (A)} = 1 | C{106 ← (A)} = 7 |
| | C{102 ← (101)} = 4 | C{107 ← (A)} = 3 |
| | C{103 ← (102)} = 6 | C{108 ← (107)} = 6 |
| | C{104 ← (103)} = 8 | C{B ← (108)} = 9 |

In the state shown in Table 8, the apparatuses 104, 105, 106, and B remain as apparatuses whose routes are undetermined. Of these apparatuses, the apparatus 106 with the smallest evaluation value is selected. The route of the apparatus A→apparatus 106 is defined as a determined route. The apparatus 106 is defined as an apparatus with a determined route. The evaluation value C is calculated for the apparatus B, which is a neighboring apparatus of the apparatus 106, of the remaining apparatuses (apparatuses 104, 105, and B).

Of the links in the route to the apparatus 106, the maximum cost is 7, and the cost of the link between the apparatus 106 and the apparatus B is 1. Hence, the maximum cost in the route from the apparatus A to the apparatus B is 7. In this route, the number of hops from the apparatus A to the apparatus B is 2. The maximum cost is multiplied by the number of hops to obtain the evaluation value (=14) of the apparatus B. Since 14 is larger than the current evaluation value=9 in Table 8, this value is not employed, and the evaluation value remains C{B←(108)}=9. As a result, parameters and routes as shown in Table 9 are obtained.

TABLE 9

| Parameter | Value | |
|---|---|---|
| Apparatuses for Which Routes from Starting Point are Determined | A, 101, 102, 103, 106, 107, 108 | |
| Apparatuses for Which Routes from Starting Point are Undetermined | 104, 105, B | |
| Determined Routes | A → 101 → 102 → 103 A → 106<br>A → 107 → 108 | |
| Evaluation Values | C(A) = 0 | C(105) = ∞ |
| | C{101 ← (A)} = 1 | C{106 ← (A)} = 7 |
| | C{102 ← (101)} = 4 | C{107 ← (A)} = 3 |
| | C{103 ← (102)} = 6 | C{108 ← (107)} = 6 |
| | C{104 ← (103)} = 8 | C{B ← (108)} = 9 |

Tables 10 to 12 are obtained in accordance with the same procedures as described above.

TABLE 10

| Parameter | Value | |
|---|---|---|
| Apparatuses for Which Routes from Starting Point are Determined | A, 101, 102, 103, 104, 106, 107, 108 | |
| Apparatuses for Which Routes from Starting Point are Undetermined | 105, B | |
| Determined Routes | A → 101 → 102 → 103 → 104 A → 106<br>A → 107 → 108 | |
| Evaluation Values | C(A) = 0 | C{105 ← (104)} = 10 |
| | C{101 ← (A)} = 1 | C{106 ← (A)} = 7 |
| | C{102 ← (101)} = 4 | C{107 ← (A)} = 3 |
| | C{103 ← (102)} = 6 | C{108 ← (107)} = 6 |
| | C{104 ← (103)} = 8 | C{B ← (108)} = 9 |

TABLE 11

| Parameter | Value |
|---|---|
| Apparatuses for Which Routes from Starting Point are Determined | A, 101, 102, 103, 104, 106, 107, 108, B |
| Apparatuses for Which Routes from Starting Point are Undetermined | 105 |
| Determined Routes | A → 101 → 102 → 103 → 104 A → 106<br>A → 107 → 108 → B |

TABLE 11-continued

| Parameter | Value | |
|---|---|---|
| Evaluation Values | C(A) = 0 | C{105 ← (104)} = 10 |
| | C{101 ← (A)} = 1 | C{106 ← (A)} = 7 |
| | C{102 ← (101)} = 4 | C{107 ← (A)} = 3 |
| | C{103 ← (102)} = 6 | C{108 ← (107)} = 6 |
| | C{104 ← (103)} = 8 | C{B ← (108)} = 9 |

TABLE 12

| Parameter | Value | |
|---|---|---|
| Apparatuses for Which Routes from Starting Point are Determined | A, 101, 102, 103, 104, 105, 106, 107, 108, B | |
| Apparatuses for Which Routes from Starting Point are Undetermined | None | |
| Determined Routes | A → 101 → 102 → 103 → 104 → 105 | |
| | A → 106 A → 107 → 108 → B | |
| Evaluation Values | C(A) = 0 | C{105 ← (104)} = 10 |
| | C{101 ← (A)} = 1 | C{106 ← (A)} = 7 |
| | C{102 ← (101)} = 4 | C{107 ← (A)} = 3 |
| | C{103 ← (102)} = 6 | C{108 ← (107)} = 6 |
| | C{104 ← (103)} = 8 | C{B ← (108)} = 9 |

Figure 3:
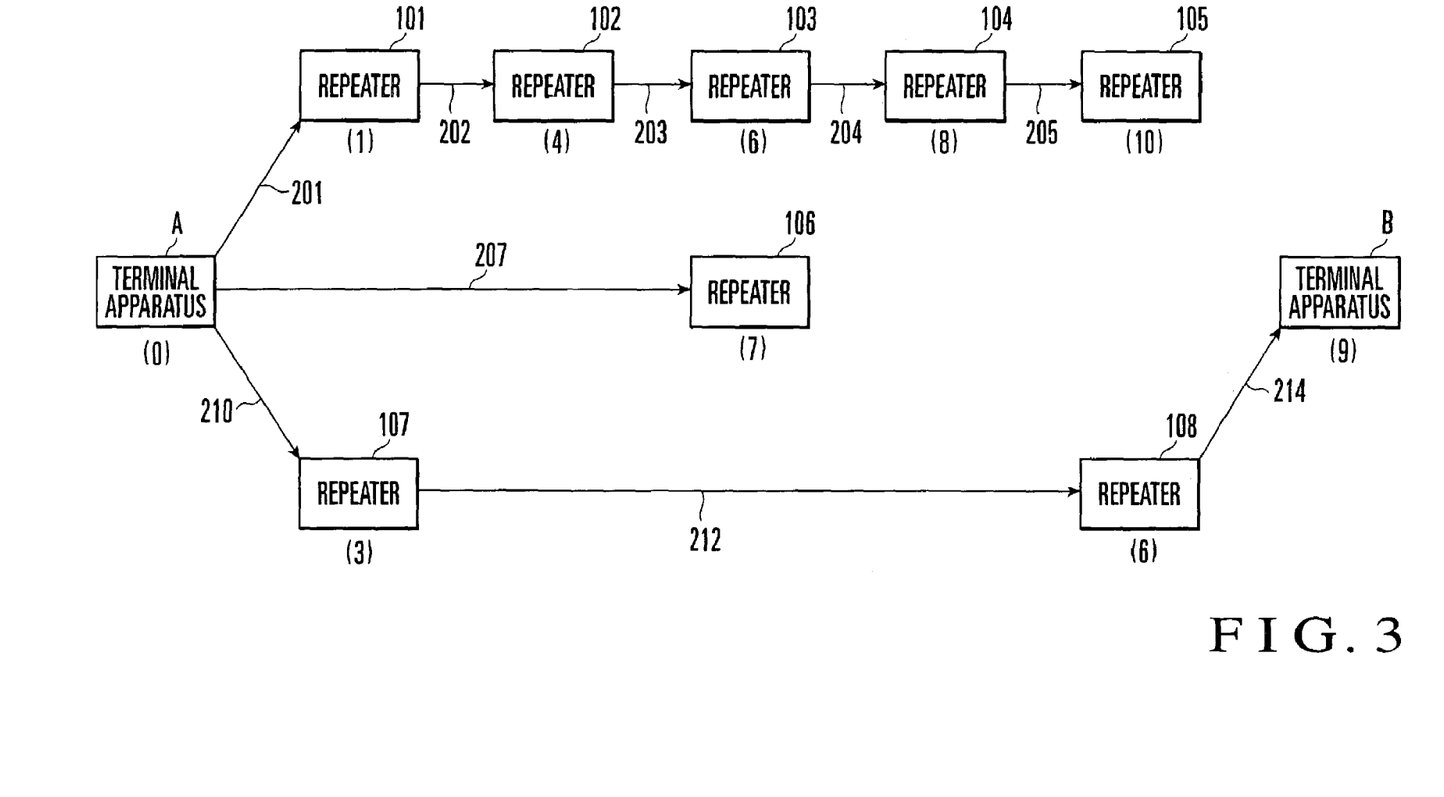
FIG. 3 is a view showing a route calculated by the route calculation algorithm.

With the above calculation process, the routes from the apparatus A to all the apparatuses are determined. FIG. 3 shows the tree of the determined routes. Numerical values in parentheses indicate evaluation values obtained as a result of calculation. The route from the apparatus A to the apparatus B is A→107→108→B. In this route, the maximum cost is 3, the number of hops is 3, and the total cost is 9.

Figure 4:
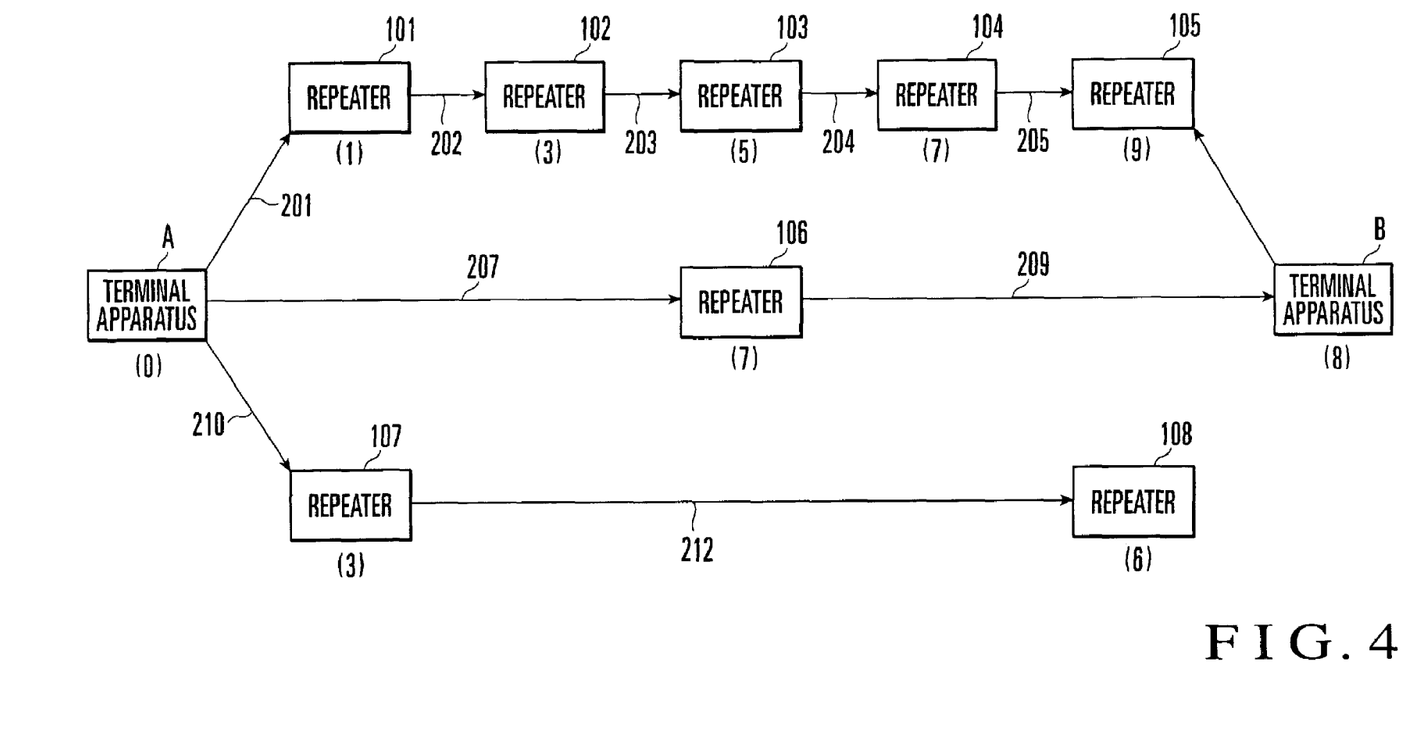
FIG. 4 is a view showing a route determined by the Dijkstra's algorithm.

This will be compared with route calculation in which conventional methods are applied to the network shown in FIG. 1. When the conventional Dijkstra's algorithm is applied, a tree of determined routes as shown in FIG. 4 is obtained. In the Dijkstra's algorithm, a route whose total cost is minimum is selected. For this reason, the route from the apparatus A to the apparatus B is A→106→and B (total cost: 8). However, this route passes through a link A→106 and (cost: 7) which has an excessively high cost and can be a traffic bottleneck.

Figure 5:
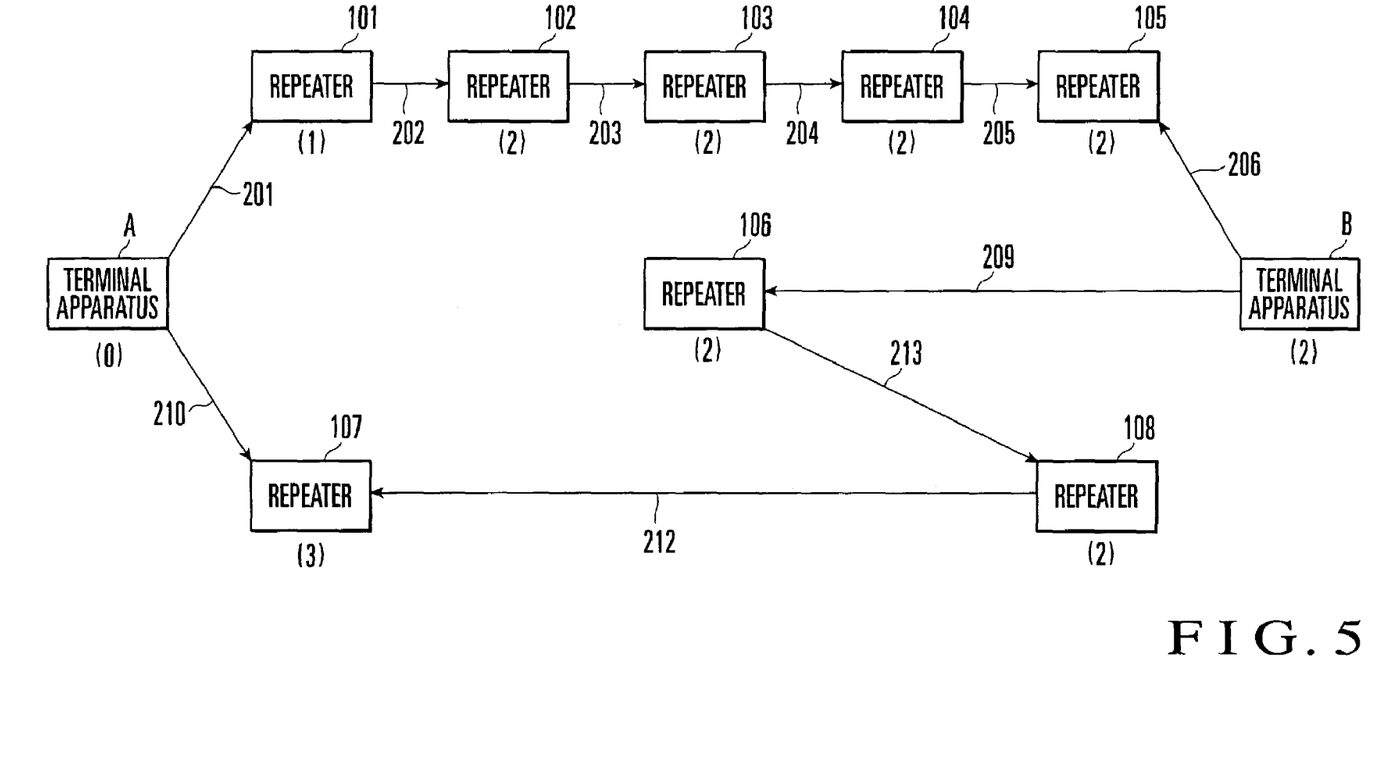
FIG. 5 is a view showing a route which is calculated by a method of not multiplying the number of hops using the maximum value of the link cost as an evaluation value.

On the other hand, when the maximum value of the cost of each link in the route is directly used as an evaluation value without multiplying the number of hops, a tree of determined routes as shown in FIG. 5 is obtained. In this case, since the route passes through links with low cost as much as possible (the maximum cost in the route is 2), any bottleneck can be avoided. However, the calculated route passes through a number of repeaters (A→101→102→103→104→105→B). An inefficient route with 6 hops is selected.

When the route calculation method of this embodiment is used, the route from the apparatus A to the apparatus B is A→107→108→B, as described above. In this route, the maximum cost is 3, the number of hops is 3, and the total cost is 9. That is, an optimum route in which the number of hops is suppressed can be calculated while avoiding any bottleneck portions in the network.

As described above, in this embodiment, since route calculation is executed on the basis of the maximum cost in the links in the route, a route can be calculated while avoiding any bottleneck portions in the communication network.

In addition,

Evaluation value C=(maximum cost in links)×(number of hops)

is calculated. Since the evaluation value for route calculation takes the factor of the number of hops into consideration, any increase in the number of hops can be suppressed even when a bottleneck is avoided.

Furthermore, since the algorithm is an extended calculation method based on the Dijkstra's algorithm, the route can be obtained in a small calculation amount.

The second embodiment of the present invention will be described next with reference to the accompanying drawings.

Figure 6:
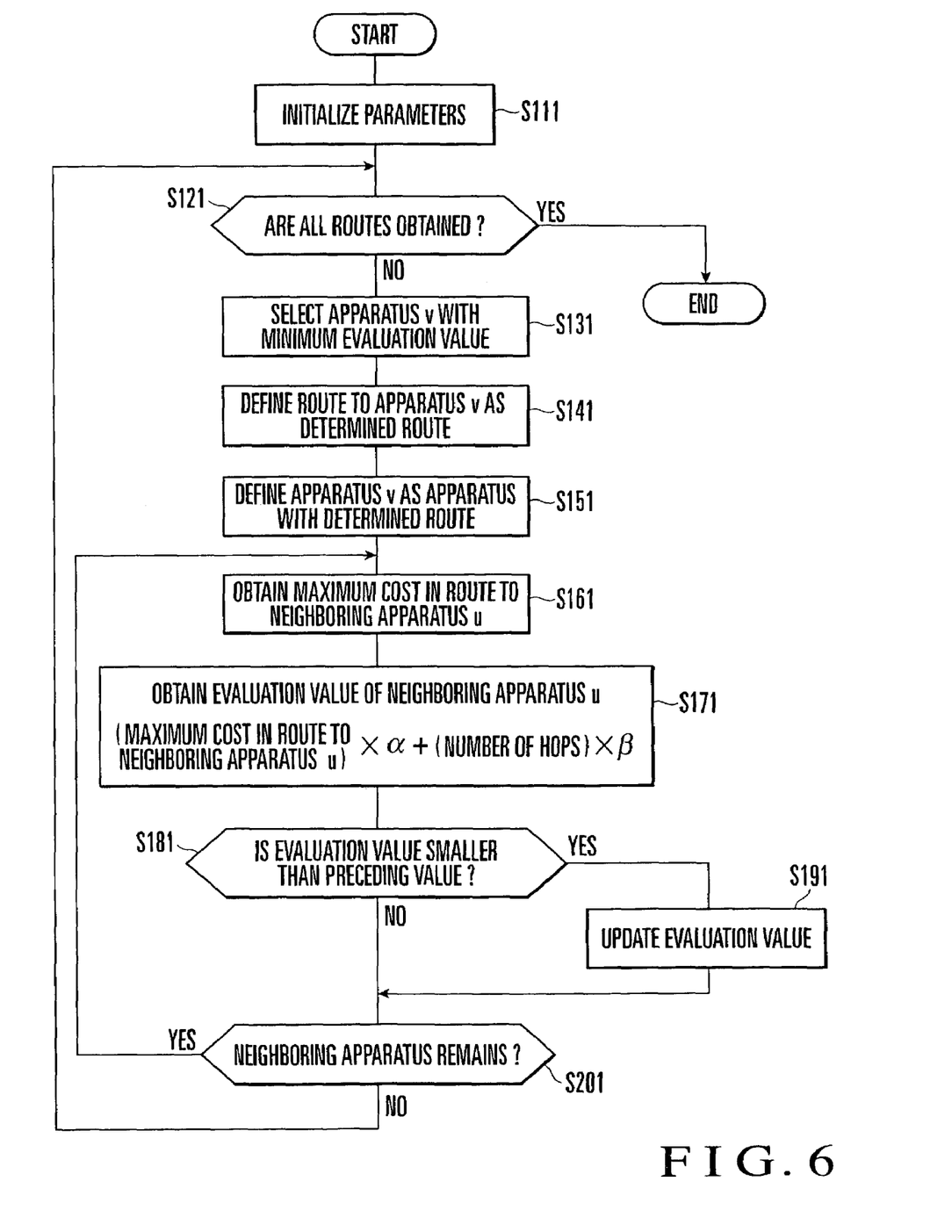
FIG. 6 is a flow chart showing a route calculation algorithm according to the second embodiment of the present invention.

FIG. 6 shows the flow chart of an algorithm according to the second embodiment. This algorithm is different from the first algorithm shown in FIG. 2 in that the evaluation value calculation formula in step S171 is changed to Evaluation value C=(maximum cost in route)×coefficient α+(number of hops in route)×coefficient β

Note that α and β are arbitrary positive values (α, β≧1).

Figure 7:
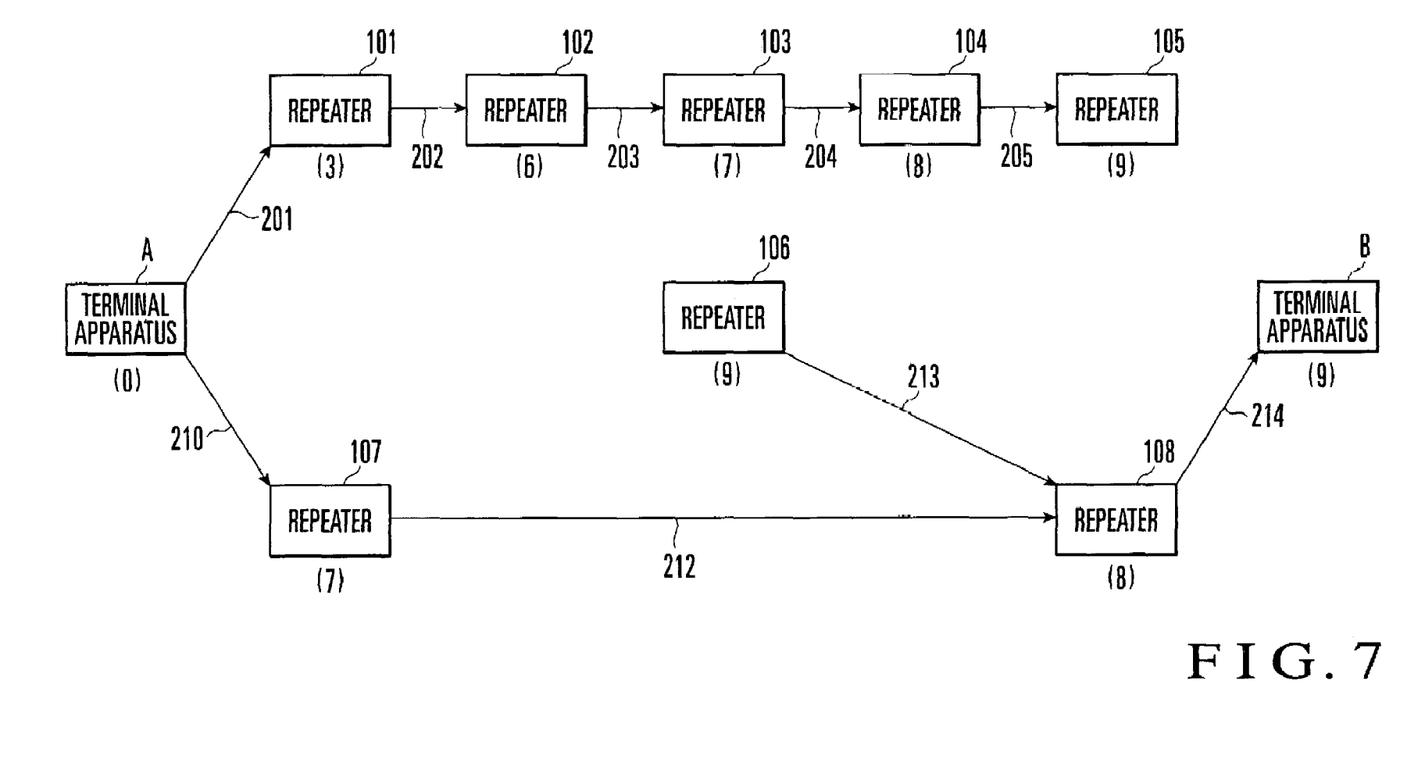
FIG. 7 is a view showing a route obtained by calculating an evaluation value by weighting the maximum cost and the number of hops.

In the above algorithm, α=1 and β=1 are set. The algorithm is applied to the network shown in FIG. 1 to execute route calculation while defining a terminal apparatus A as a starting point. The calculation result is shown in Table 13. FIG. 7 shows the tree of determined routes.

TABLE 13

| Parameter | Value | |
|---|---|---|
| Apparatuses for Which Routes from Starting Point are Determined | A, 101, 102, 103, 104, 105, 106, 107, 108, B | |
| Apparatuses for Which Routes from Starting Point are Undetermined | None | |
| Determined Routes | A → 101 → 102 → 103 → 104 → 105 | |
| | A → 107 → 108 → 106 | |
| | A → 107 → 108 → B | |
| Evaluation Values | C(A) = 0 | C{105 ← (104)} = 9 |
| | C{101 ← (A)} = 3 | C{106 ← (108)} = 9 |
| | C{102 ← (101)} = 6 | C{107 ← (A)} = 7 |
| | C{103 ← (102)} = 7 | C{108 ← (107)} = 8 |
| | C{104 ← (103)} = 8 | C{B ← (108)} = 9 |

The route from the apparatus A to an apparatus B is A→107→108→B, i.e., the same as that obtained when the algorithm shown in FIG. 2 is used. In this route, the maximum cost is 3, the number of hops is 3, and the total cost is 9.

Figure 8:
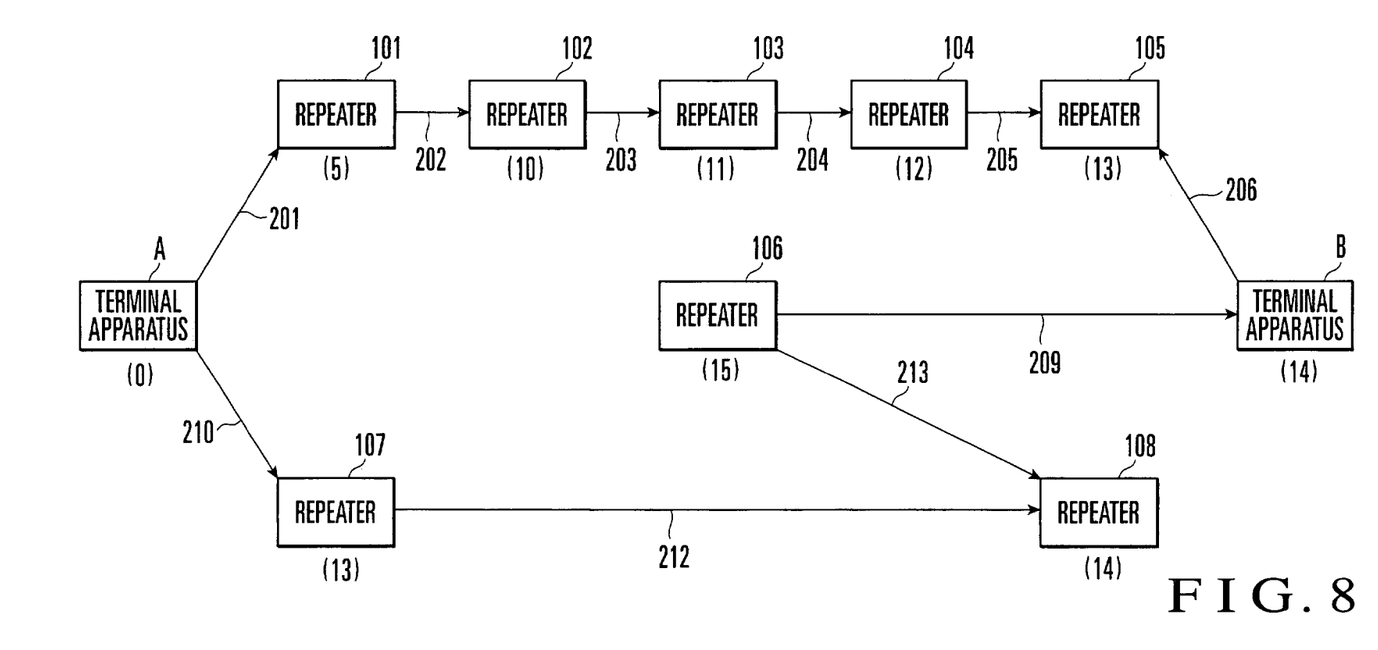
FIG. 8 is a view showing a route obtained by calculating an evaluation value by weighting the maximum cost and the number of hops.

In addition, α=4 and β1 are set, and route calculation is executed while defining the terminal apparatus A in the network shown in FIG. 1 as a starting point. The calculation result is shown in Table 14. FIG. 8 shows the tree of determined routes.

TABLE 14

| Parameter | Value |
|---|---|
| Apparatuses for Which Routes from Starting Point are Determined | A, 101, 102, 103, 104, 105, 106, 107, 108, B |
| Apparatuses for Which Routes from Starting Point are Undetermined | None |
| Determined Routes | A → 101 → 102 → 103 → 104 → 105 → |
| | B → 106 A → 107 → 108 → 106 |

TABLE 14-continued

| Parameter | Value | |
|---|---|---|
| Evaluation Values | C(A) = 0 | C{105 ← (104)} = 13 |
| | C{101 ← (A)} = 5 | C{106 ← (108, B)} = 15 |
| | C{102 ← (101)} = 10 | C{107 ← (A)} = 13 |
| | C{103 ← (102)} = 11 | C{108 ← (107)} = 14 |
| | C{104 ← (103)} = 12 | C{B ← (105)} = 14 |

The route from the apparatus A to the apparatus B is A→101→102→103→104→105→B. In this route, the maximum cost is 2, the number of hops is 6, and the total cost is 10. When $\alpha=4$ and $\beta=1$ are set, calculation is executed by placing more emphasis on the maximum cost than the number of hops. Hence, a route that passes links with lower costs is selected. However, the number of hops increases.

In this embodiment, an evaluation value is obtained using calculation that weights each of the maximum cost and the number of hops in a route. When the evaluation value calculation formula is changed in this way, routing can be executed while freely adjusting the degree of importance of the maximum cost and the number of hops.

Figure 9:
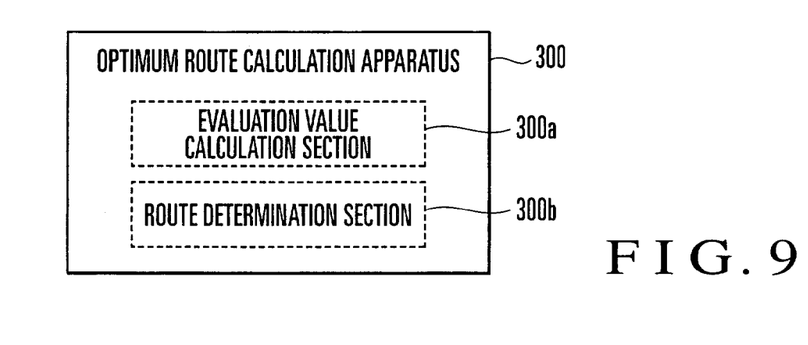
FIG. 9 is a block diagram showing a structure of a optimum route calculation apparatus according to the embodiment of the present invention.

The above-described optimum route calculation can be done by an optimum route calculation apparatus 300 which is connected to the network together with the above-described repeaters and terminal apparatuses. The optimum route calculation apparatus 300 comprises an evaluation value calculation section 300a and route determination section 300b, as shown in FIG. 9.

The evaluation value calculation section 300a obtains an evaluation value on the basis of the maximum value of the cost of each transmission path included in a determined route and a route to be evaluated and the number of hops from the determined route to the route to be evaluated. The route determination section 300b determines a route on the basis of the evaluation value.

The above-described embodiments are preferred embodiments of the present invention. However, the present invention is not limited to these embodiments, and various changes and modifications can be made within the spirit and scope of the invention. In addition, the embodiment of the optimum route calculation program of the present invention can be implemented when a program which causes a computer to execute route calculation in accordance with the above-described procedure is stored through, e.g., a storage medium (e.g., a CD-ROM) that records the program, and the computer executes route calculation in accordance with the program.

As is apparent from the above description, since route calculation is executed on the basis of the maximum cost in links in a route, a route can be calculated while avoiding any traffic bottleneck in a communication network.

In addition, evaluation value C=(maximum cost in links)× (number of hops) is calculated, and the evaluation value for route calculation is calculated in consideration of the factor of the number of hops. For this reason, any increase in the number of hops can be suppressed even when a bottleneck is avoided.

Furthermore, since the algorithm is an extended calculation method based on the Dijkstra's algorithm, a route can be obtained in a small calculation amount.

What is claimed is:

1. An optimum route calculation method of calculating an optimum route in a network which has a plurality of nodes and a plurality of transmission paths that connect the nodes, and in which a cost is defined for each transmission path, comprising the steps of:

obtaining an evaluation value on a basis of a maximum value of the cost of each transmission path included in a determined route and a route to be evaluated and a number of hops from the determined route to the route to be evaluated; and determining a route on a basis of the evaluation value, wherein the evaluation value obtaining step comprises a step of multiplying the maximum value of the cost by the number of hops.

2. An optimum calculation method of calculating an optimum route in a network which has a plurality of nodes and a plurality of transmission paths that connect the nodes, and in which a cost is defined for each transmission path, comprising the steps of:

obtaining an evaluation value on a basis of a maximum value of the cost of each transmission path included in a determined route and a route to be evaluated and a number of hops from the determined route to the route to be evaluated; and determining a route on a basis of the evaluation value, wherein the evaluation value obtaining step comprises a step of adding a value obtained by multiplying the maximum value of the cost by a coefficient $\alpha$ ($\alpha$ is an arbitrary positive value ($\alpha \geq 1$)) to a value obtained by multiplying the number of hops by a coefficient $\beta$ ($\beta$ is an arbitrary positive value ($\beta \geq 1$)).

3. The method according to claim 1, further comprising steps of:

selecting an apparatus v having a minimum evaluation value C(u) from apparatuses for which routes are undetermined;

determining a route from apparatuses with determined routes to the apparatus v;

registering the apparatus v with the determined route in the apparatuses with the determined routes; and calculating the evaluation value C(u) for an apparatus u, which is a neighboring apparatus of the apparatus v and is connected to the apparatus v by a direct transmission path, of the apparatuses for which the routes are undetermined, wherein the multiplying step comprises the steps of:

comparing a value of a maximum cost in links in a route from a starting point to the apparatus v with a cost of a link between the apparatus v and the apparatus u and defining the higher cost as the maximum cost in the route from the starting point to the apparatus u;

multiplying the maximum cost by a value of the number of hops in the route from the starting point to the apparatus u to thereby calculate the evaluation value of the apparatus u; and in case the evaluation value of the apparatus u has already been calculated, comparing the evaluation value with the evaluation value obtained in the calculation step, and if the evaluation value obtained in the calculation step is smaller, then updating the evaluation value as a new evaluation value C(u) of the apparatus u.

4. The method according to claim 2, further comprising the steps of:

selecting an apparatus v having a minimum evaluation value C(u) from apparatuses for which routes are undetermined;

determining a route from apparatuses with determined routes to the apparatus v;

registering the apparatus v with the determined route in the apparatuses with the determined routes; and calculating the evaluation value C(u) for an apparatus u, which is a neighboring apparatus of the apparatus v and is connected to the apparatus v by a direct transmission path, of the apparatuses for which the routes are undetermined, wherein the multiplying step comprises the steps of:

comparing a value of a maximum cost in links in a route from a starting point to the apparatus v with a cost of a link between the apparatus v and the apparatus u, and defining a higher cost as the maximum cost in the route from the starting point to the apparatus u;

adding a value obtained by multiplying the maximum cost by a coefficient $\alpha$ ($\alpha$ is an arbitrary positive value ($\alpha \geq 1$)) to a value obtained by multiplying a number of hops in the route from the starting point to the apparatus u by a coefficient $\beta$ (($\beta$ is an arbitrary positive value ($\beta \geq 1$)) to calculate the evaluation value of the apparatus u; and in case the evaluation value of the apparatus u has already been calculated, comparing the evaluation value with the evaluation value obtained in the calculation step, and if the evaluation value obtained in the calculation step is smaller, then updating the evaluation value as the new evaluation value C(u) of the apparatus u.

5. A computer-readable recording medium on which is tangibly recorded a program of machine-readable instructions that, when executed, cause a computer to execute processing for calculating an optimum route in a network which has a plurality of nodes and a plurality of transmission paths that connect the nodes, and in which a cost is defined for each transmission path, wherein the program comprises a program which causes the computer to execute the steps of:

obtaining an evaluation value on a basis of a maximum value of the cost of each transmission path included in a determined route and a route to be evaluated and a number of hops from the determined route to the route to be evaluated; and determining a route on a basis of the evaluation value, wherein the program comprises a program which causes a computer to execute a step of multiplying the maximum value of the cost by the number of hops.

6. A computer-readable medium on which is tangibly recorded a program of machine-readable instruction that, when executed, causes a computer to execute processing for calculating an optimum route in a network which has a plurality of nodes and a plurality of transmission paths that connect the nodes, and in which a cost is defined for each transmission path, wherein the program comprises a program which causes the computer to execute the steps of:

obtaining an evaluation value on a basis of a maximum value of the cost of each transmission path included in a determined route and a route to be evaluated and a number of hops from the determined route to the route to be evaluated; and determining a route on a basis of the evaluation value, wherein the program comprises a program which causes a computer to execute a step of adding a value obtained by multiplying the maximum value of the cost by a coefficient $\alpha$ ($\alpha$ is an arbitrary positive value ($\alpha \geq 1$)) to a value obtained by multiplying the number of hops by a coefficient $\beta$ ($\beta$ is an arbitrary positive value ($\beta \geq 1$)).

7. A computer-readable recording medium according to claim 5, wherein the program comprises a program which causes a computer to execute the steps of:

selecting an apparatus v having a minimum evaluation value C(u) from apparatuses for which routes are undetermined;

determining a route from apparatuses with determined routes to the apparatus v;

registering the apparatus v with the determined route in the apparatuses with the determined routes;

calculating the evaluation value C(u) for an apparatus u, which is a neighboring apparatus of the apparatus v and is connected to the apparatus v by a direct transmission path, of the apparatuses for which the routes are undetermined;

comparing a value of a maximum cost in links in a route from a starting point to the apparatus v with a cost of a link between the apparatus v and the apparatus u and defining a higher cost as the maximum cost in the route from the starting point to the apparatus u;

multiplying the maximum cost by a value of a number of hops in the route from the starting point to the apparatus u to calculate the evaluation value of the apparatus u; and in case the evaluation value of the apparatus u has already been calculated, comparing the evaluation value with the evaluation value obtained in the calculation step, and if the evaluation value obtained in the calculation step is smaller, then updating the evaluation value as the new evaluation value C(u) of the apparatus u.

8. A computer-readable recording medium according to claim 6, wherein the program comprises a program which causes a computer to execute the steps of:

selecting an apparatus v having a minimum evaluation value C(u) from apparatuses for which mutes are undetermined;

determining a route from apparatuses with determined routes to the apparatus v;

registering the apparatus v with the determined route in the apparatuses with the determined routes;

calculating the evaluation value C(u) for an apparatus u, which is a neighboring apparatus of the apparatus v and is connected to the apparatus v by a direct transmission path, of the apparatuses for which the routes are undetermined;

comparing a value of a maximum cost in links in a route from a starting point to the apparatus v with a cost of a link between the apparatus v and the apparatus u and defining a higher cast as the maximum cost in the route from the starting point to the apparatus u;

adding a value obtained by multiplying the maximum cost by a coefficient $\alpha$ ($\alpha$ is an arbitrary positive value ($\alpha \geq 1$)) to a value obtained by multiplying a number of hops in the route from the starting point to the apparatus u by a coefficient $\beta$ ($\beta$ is an arbitrary positive value ($\beta \geq 1$)) to calculate the evaluation value of the apparatus u; and in case the evaluation value of the apparatus u has already been calculated, comparing the evaluation value with the evaluation value obtained in the calculation step, and if the evaluation value obtained in the calculation step is smaller, then updating the evaluation value as the new evaluation value C(u) of the apparatus u.

9. An optimum route calculation system comprising:

a plurality of nodes;

a plurality of transmission paths that connect the nodes; and an optimum route calculation apparatus which calculates an optimum route in a network in which a cost is defined for each transmission path, wherein said optimum route calculation apparatus comprises:

an evaluation value calculation means for obtaining an evaluation value on a basis of a maximum value of the cost of each transmission path included in a determined route and a route to be evaluated and a number of hops from the determined route to the route to be evaluated; and a route determination means for determining a route on a basis of the evaluation value, wherein the evaluation value obtaining step comprises a step of multiplying the maximum value of the cost by the number of hops.

* * * * *